(12) United States Patent
Dai et al.

(10) Patent No.: US 9,146,753 B2
(45) Date of Patent: Sep. 29, 2015

(54) LOADING PROGRAM MODULES

(75) Inventors: Hai Bin Dai, Shanghai (CN); Susan S. Hanis, Research Triangle Park, NC (US); Jason R. Gary, Clermont, FL (US); Hai Jie Wu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 313 days.

(21) Appl. No.: 13/484,388

(22) Filed: May 31, 2012

(65) Prior Publication Data

US 2012/0311554 A1 Dec. 6, 2012

(30) Foreign Application Priority Data

May 31, 2011 (CN) .......................... 2011 1 0144285

(51) Int. Cl.
*G06F 9/445* (2006.01)
*H04L 29/08* (2006.01)

(52) U.S. Cl.
CPC ................. *G06F 9/445* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,230,184 B1 * | 5/2001 | White et al. ................... | 709/201 |
| 6,530,080 B2 | 3/2003 | Fresko et al. | |
| 6,559,871 B1 * | 5/2003 | Brozowski et al. ........... | 715/853 |
| 6,901,589 B2 * | 5/2005 | White ........................... | 717/166 |
| 7,178,140 B2 | 2/2007 | Dmitriev | |
| 7,316,010 B1 * | 1/2008 | Daynes et al. ................. | 717/140 |
| 7,389,515 B1 | 6/2008 | Seth et al. | |
| 8,543,731 B2 * | 9/2013 | Lu et al. ........................ | 709/244 |
| 2003/0009751 A1 * | 1/2003 | White ........................... | 717/166 |
| 2004/0015953 A1 | 1/2004 | Vincent | |
| 2004/0255294 A1 * | 12/2004 | Spotwood ..................... | 717/176 |
| 2005/0108418 A1 * | 5/2005 | Bedi et al. ..................... | 709/232 |
| 2006/0059156 A1 | 3/2006 | Janes et al. | |
| 2007/0288556 A1 * | 12/2007 | Anton et al. .................. | 709/203 |
| 2008/0133811 A1 * | 6/2008 | Lu et al. ........................ | 710/244 |
| 2009/0031210 A1 * | 1/2009 | Backhouse ................... | 715/234 |
| 2009/0125611 A1 * | 5/2009 | Barsness et al. .............. | 709/220 |

FOREIGN PATENT DOCUMENTS

WO 9744942 A2 11/1997

OTHER PUBLICATIONS

Conte, M., et al., A Study of Code Reuse and Sharing Characteristics of Java Applications, Workload Characterization: Methodology and Case Studies, 1999, pp. 27-35, [retrieved on May 13, 2015], Retrieved from the Internet: <URL:http://ieeexplore.ieee.org/>.*

(Continued)

*Primary Examiner* — Thuy Dao
*Assistant Examiner* — Geoffrey St Leger
(74) *Attorney, Agent, or Firm* — Cuenot, Forsythe & Kim, LLC

(57) ABSTRACT

Loading program modules with hierarchical relationship can include receiving a request for loading the program modules from a client, the request including root module information in the program modules to be loaded and, according to the root module information in the request, obtaining a root module to be loaded and child modules of the root module to be loaded using a central processing unit. The root module and the child modules of the root module can be sent to the client.

15 Claims, 6 Drawing Sheets

(56) References Cited

OTHER PUBLICATIONS

Schapranow, M-P., et al., Data Loading & Caching Strategies in Service-Oriented Enterprise Applications, World Conference on Services, 2009, pp. 368-375, [retrieved on May 13, 2015], Retrieved from the Internet: <URL:http://ieeexplore.ieee.org/>.*

"The Class Loader Hierarchy," [online] Oracle, [retrieved May 3, 2012] retrieved from the Internet: <http://bits.netbeans.org/dev/javadoc/org-openide-modules/org/openide/modules/doc-files/classpath.html>, 8 pgs.

Sosnoski, D., "Java Programming Dynamics, Part 1: Java Classes and Class Loading," [online] IBM Corporation developerWorks, Apr. 29, 2003, [retrieved May 3, 2012] retrieved from the Internet: <http://www.ibm.com/developerworks/java/library/j-dyn0429/>, 6 pgs.

"Developing Applications With Weblogic Server, Understanding Weblogic Server Application Classloading," [online] BEA Systems [retrieved May 3, 2012] retrieved from the Internet: <http://docs.oracle.com/cd/E12840_01/wls/docs103/programming/classloading.html>, 15 pgs.

* cited by examiner

LOADING PROGRAM MODULES

CROSS-REFERENCE TO RELATED APPLICATIONS

This application claims the benefit of China Application Number 201110144285.2 filed on 31 May 2011, which is fully incorporated herein by reference.

BACKGROUND

With the increases in the size and the amount of code of computer application programs, and the promotion of the program modularization, more and more program developers avoid repetitive programming work by referencing existing common codes (such as Common Library). These repetitively-used codes may include Program Class and other code packets, which are components or modules to constitute an application program. A great application program may be constituted of a plurality of such program modules, and there may usually be hierarchical relationship between these program modules (which also can be understood as a father-son relationship or invoking dependence relationship). Now when many application program are developed, tested or run, it is necessary to transmit/invoke/load these repetitively-usable program components or modules with hierarchical relationship through networks.

Now, there are several technical solutions for transmitting program modules through networks. One is to load the entire Library. Since the Library normally is big in size, and what is really needed to be invoked is only partial modules in the Library, loading the entire Library may cause unnecessary content transmission, extending the loading period.

The second technical solution in the prior art is to only load necessary code units. For example, Widget A of a client needs 100 code packages in some Library, while Widget B of the client needs 50 code packages in the Library (in which, some of code packages are the same with the code packages needed by the Widget A), and although during the transmission, the Widgets A and B both can only request a server end to transmit its needed code packages, can also avoid transmitting the same code packages, and can avoid the transmission of unnecessary and repetitive code contents, the Widgets A and B need to issue a request to the server for each of its needed code packages, resulting in rapid increase of the number of network requests, which will also extend the loading period greatly.

The third technical solution in prior art is to pack the code packages needed by different applications (such as Widget) of the client by program developers in advance, and then, when invoking each Widget, the packed program packages are directly sent to the client. The advantage of such technical solution is that loading the entire Library can be avoided, and excessive network requests can also be avoided, but the disadvantage is that numerous repetitive code packages may be sent to the client, since the code packages needed by the Widget A of the client and the code packages needed by the Widget B have repetition, in the case of loose-coupling the program development (in which, the loose-coupling indicates there are a plurality developers for some application program, for example, the developers of the Widget A and the developers of the Widget B do not know whether the Widget developed by each other needs the same code packages), different program developers can not know which of the code packages are repetitive in advance.

BRIEF SUMMARY

One embodiment can include a method for loading program modules with hierarchical relationship. The method can include receiving a request for loading the program modules from a client, the request including root module information in the program modules to be loaded, and, according to the root module information in the request, obtaining a root module to be loaded and child modules of the root module to be loaded using a central processing unit. The method further can include sending said root module and said child modules of the root module to said client.

Another embodiment can include a system for loading program modules with hierarchical relationship. The system can include a central processing unit configured to initiate executable operations. The executable operations can include receiving a request for loading the program modules from a client, the request including root module information in the program modules to be loaded, and, according to the root module information in the request, obtaining a root module to be loaded and child modules of the root module to be loaded using a central processing unit. The executable operations also can include sending said root module and said child modules of the root module to said client.

Another embodiment can include a computer program product for loading program modules with hierarchical relationship. The computer program product can include a computer readable storage medium having stored thereon program code that, when executed, configures a processor to perform executable operations. The executable operations can include receiving a request for loading the program modules from a client, the request including root module information in the program modules to be loaded, and, according to the root module information in the request, obtaining a root module to be loaded and child modules of the root module to be loaded using a central processing unit. The executable operations also can include sending said root module and said child modules of the root module to said client.

BRIEF DESCRIPTION OF THE SEVERAL VIEWS OF THE DRAWINGS

The features and advantages of the embodiments of the invention will be particularly explained with reference to the appended drawings. If possible, the same or like reference number denotes the same or like component in the drawings and the description. In the drawings.

DETAILED DESCRIPTION

Figure 1:
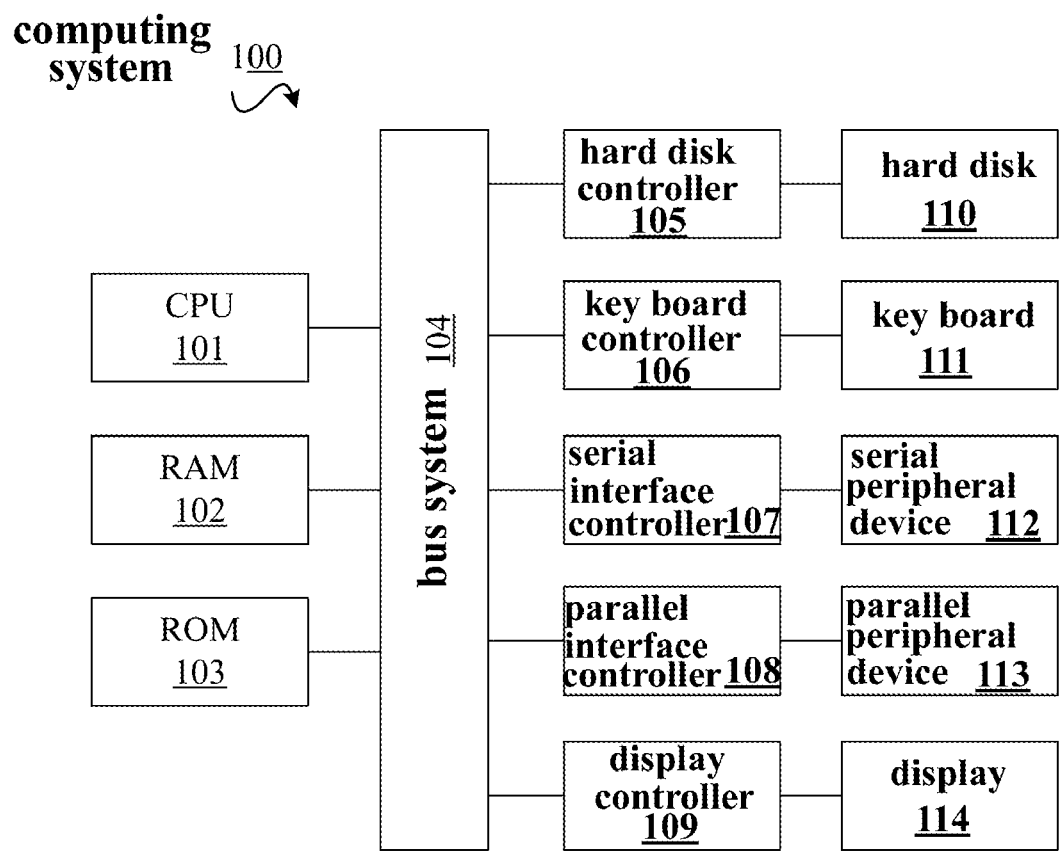
FIG. 1 shows a block diagram of an illustrative computing system 100 adapted to realize an embodiment of the invention.

Below, the method and system for loading program modules with hierarchical relationship provided by the invention will be described in detail with reference to the drawings with the embodiments.

The present invention relates to application program processing field. More particularly, the present invention relates to methods and systems for loading program modules with hierarchical relationship in an application program.

One of the objects of the invention is to provide one method or system capable of loading program modules with hierarchical relationship in the case of loose-coupling. Another object of the invention is to provide program modules capable of loading program modules with hierarchical relationship in the case of loose-coupling and avoiding repetitive code transmission. A further object of the invention is to provide program modules capable of loading program modules with hierarchical relationship in the case of loose-coupling and avoiding unnecessary code transmission. A further object of the invention is to provide program modules capable of loading program modules with hierarchical relationship in the case of loose-coupling and avoiding a great deal of or complicated network requests. The above four sub-objects are dependent on each other, the inventive object of the invention does not necessarily reach the above four sub-objects, but instead, may only realize one or a combination of any number of the objects.

According to one aspect of the invention, a method for loading program modules with hierarchical relationship, comprises: receiving a request for loading the program modules from a client, said request including root module information in the program modules to be loaded; according to the root module information in said request, obtaining a root module to be loaded and child modules of the root module to be loaded; and sending said root module and said child modules of the root module to said client.

According to an embodiment of the invention, the above method further includes: receiving a notification relating to the loaded program modules from the client, said notification including the root module information in the loaded program modules; and according to the root module information in said notification, obtaining information of the loaded root module and said child modules of the loaded root module.

According to one aspect of the invention, a system for loading program modules with hierarchical relationship, comprises: request receiving means, configured to receive a request for loading the program modules from a client, said request including root module information in the program modules to be loaded; first obtaining means, configured to, according to the root module information in said request, obtain a root module to be loaded and child modules of the root module to be loaded; and loading means, configured to send said root module and said child modules of the root module to said client.

According to an embodiment of the invention, the above system further includes: notification receiving means, configured to receive a notification relating to the loaded program modules from the client, said notification including the root module information in the loaded program modules; and second obtaining means, configured to, according to the root module information in said notification, obtain information of the loaded root module and said child modules of the loaded root module.

With the method and system of the invention, program modules with hierarchical relationship can be loaded in the case of loose-coupling, and repetitive code transmission and/or unnecessary code transmission and/or a great deal of network requests can be avoided.

FIG. 1 shows a block diagram of an illustrative computing system 100 adapted to realize an embodiment of the invention. As shown, the computer system 100 may include: CPU (Central Processing Unit) 101, RAM (Random Access memory) 102, ROM (Read Only Memory) 103, system bus 104, hard disk controller 105, keyboard controller 106, serial interface controller 107, parallel interface controller 108, display controller 109, hard disk 110, keyboard 111, serial peripheral device 112, parallel peripheral device 113 and display 114. In these devices, what are coupled with the system bus 104 are the CPU 101, the RAM 102, the ROM 103, the hard disk controller 105, the keyboard controller 106, the serial controller 107, the parallel controller 108 and the display controller 109. The hard disk 110 is coupled with the hard disk controller 105, the keyboard 111 is coupled with the keyboard controller 106, the serial peripheral device 112 is coupled with the serial interface controller 107, the parallel peripheral device 113 is coupled with the parallel interface controller 108, and the display 114 is coupled with the display controller 109. It should be understood that the structural block diagram as shown in FIG. 1 is shown only for illustrative purpose, but not for limitation on the scope of the invention. In some cases, some devices may be increased or reduced according to particular conditions.

Figure 2:
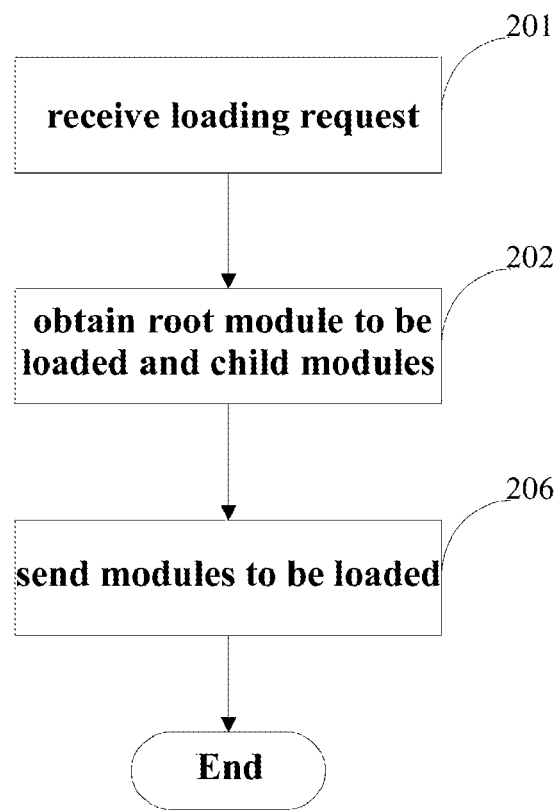
FIG. 2 shows a flowchart of a method for loading program modules with hierarchical relationship according to an embodiment of the invention.

FIG. 2 shows a flowchart of a method for loading program modules with hierarchical relationship according to an embodiment of the invention.

The method as shown in FIG. 2 starts from step 201, in which, a request for loading the program modules from a client is received, said request including root module information in the program modules to be loaded. The client herein is a concept relative to a server end, and may be client agent, browser, Widget, computer for requesting to load program modules during the program developers' development and test, and so on, but not necessarily be terminal user. In all, any software, hardware such as application, plug-in, computer and so on for issuing a request for loading program modules may be understood as the client herein.

According to an embodiment of the invention, the request for loading program modules only includes the root module information in the program modules to be loaded. According to another embodiment of the invention, the request for loading program modules includes the root module information in the program modules to be loaded and part of or all of child module information of the root module. If the request for loading program modules only includes the root module information in the program modules to be loaded, all the child modules of the root module can be obtained according to the root module information and the hierarchical relationship information between the program modules. If the request for loading program modules includes the root module information in the program modules to be loaded and part of or all of child module information of the root module, although there are partial repetitive analysis processes, it can still ensured that all the child modules of the root module will be obtained. Certainly, the client can not obtain the hierarchical relationship between the program modules not yet loaded, so when sending the request, if the program modules to be loaded have not been loaded to the client, the client does not know which of these program modules to be loaded are root modules, and which of them are child modules, so its request may only include the root module, or may include the root module and the child modules. However, in any case, the root module must be included in the request (since if one module needs to be loaded by the client, but has not been loaded, and no other modules to be loaded depend on the module, the module is the root module, and must be included in the request sent by the client).

It needs to be pointed out that the program modules with hierarchical relationship have relationship of invoking each other or relationship of depending on each other. Thus, the program module which only depends on other program modules but is not depended on by other program modules is called the root module (the highest module), and the program modules depended on by the root module are called the child modules. The relationship between the root module and the child modules may be simply understood as the relationship between the root node and the child modules in a tree shape diagram. It needs to be pointed out that one request for loading program modules from the client may include information for loading one or more root modules, for example, the client request to load two program modules, the two program modules do not have hierarchical relationship between each other, and for this client, not any other program module which needs to be loaded (the program modules which need to be loaded do not include the program modules which have been loaded) depends on the two modules, so the two program modules both are root modules.

According to an embodiment of the invention, the program modules in the invention are one or more of the repetitively-usable code package, code unit, code component, Program Class. The person skilled in the art should understand that the concept of the program modules emphasizes units, parts constituting the program, which can be embodied as different forms in different coding environment. According to an embodiment of the invention, the program modules with hierarchical relationship in the invention are source code modules which have not been compiled. According to another embodiment of the invention, the program modules with hierarchical relationship in the invention are target code (binary code) modules which have been compiled. The person skilled in the art should understand that no matter whether the program module is source code or target code, the invention can be applied as long as they have hierarchical relationship information with each other.

Next, the method as shown in FIG. 2 proceeds to step 202, in which, according to the root module information in the request, the root module to be loaded and the child modules of the root module to be loaded. Why the root module to be loaded and its child modules can be obtained according to the root module information in the request is because the hierarchical relationship information between the program modules has been obtained. According to an embodiment of the invention, the hierarchical relationship information between all the program modules is obtained by sequentially analyzing each program module. According to another embodiment of the invention, in response to the request for loading the program modules from the client, the hierarchical relationship information between the program modules to be loaded is obtained. According to another embodiment of the invention, the hierarchical relationship information between the program modules to be loaded is obtained by the input of the program developer. By using the hierarchical relationship information between the program modules which has been obtained and the root module information in the program module loading request, one-order child modules of the root module to be loaded and the child modules of the one-order child modules and so on can be analyzed, so that information of all the program module with hierarchical relationship to be loaded is determined, and further the program modules with hierarchical relationship to be loaded is obtained. The person skilled in the art should understand, the hierarchical relationship information can be obtained by many methods, and the above three embodiments given out above are only for illustrative purpose, but not for any limitation on embodiments.

Next, in step 206, the root module and the child modules of the root module are sent to the client. Thus, the client can realize the loading of all the program modules to be loaded.

According to an embodiment of the invention, in step 201, the receiving of the request in step 201 and the sending of the modules in the step 206 both are performed through Ethernet network or other networks.

With the method as shown in FIG. 2, different from the existing technical solution, when sending the request for loading the program modules, the client can only notify of the root module information of the program modules to be loaded, and by only sending the loading request only once (and the loading request is very simple, and only includes the root module information), the loading of all the modules to be loaded can be implemented (and only program modules needed by the client are loaded), so that the invention can realize the purpose of avoiding transmitting unnecessary code contents and avoiding complicated network requests.

Figure 3A:
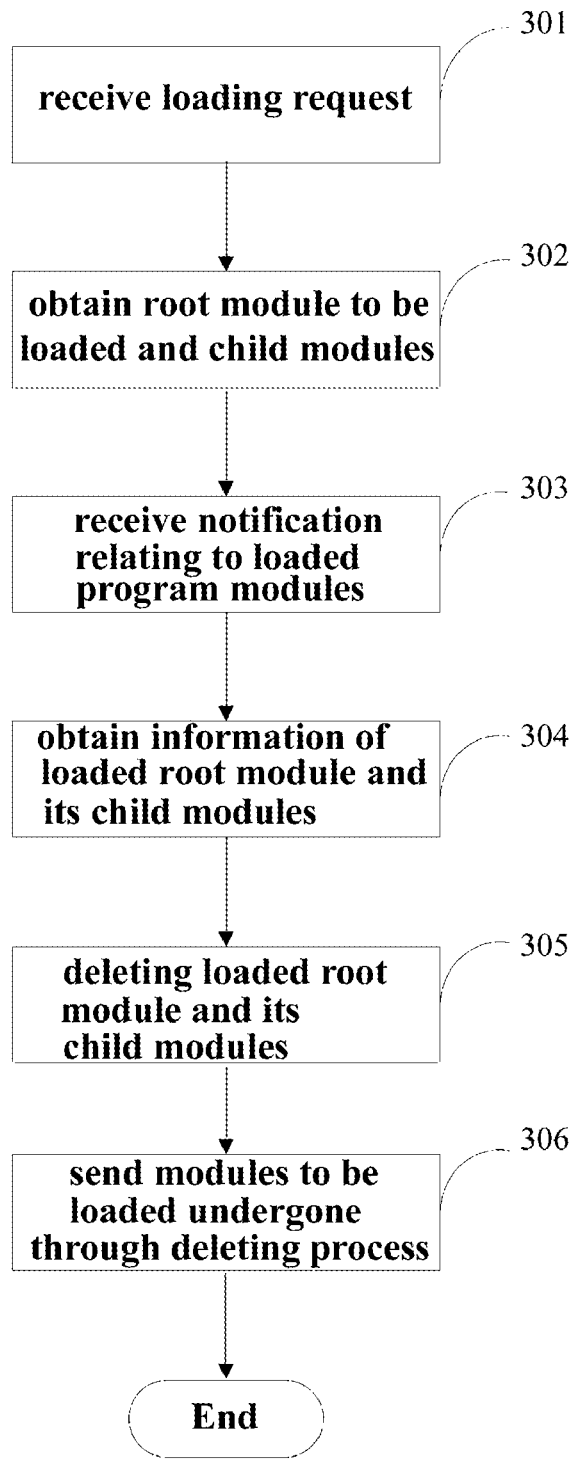
FIG. 3A shows a flowchart of a method for loading program modules with hierarchical relationship according to another embodiment of the invention.

FIG. 3A shows a flowchart of a method for loading program modules with hierarchical relationship according to another embodiment of the invention.

Steps 301 and 302 in the method as shown in FIG. 3A correspond to steps 201 and 202 in the method as shown in FIG. 2 respectively, which will not be described again. In step 303, the notification relating to the loaded program modules from the client is received, said notification including the root module information in the loaded program modules. Since in previous loading process (for example, another request of the client loads Widget or other plug-ins of the program modules), and some program modules may have been loaded to the client, in order to avoid repetitively loading the same program modules, preferably, the client will notify of the information of the loaded program modules in the current program modules to be loaded. According to one embodiment of the invention, the notification relating to the loaded program modules only includes the root module information in the loaded program modules. This is because, although many program modules have been loaded, due to the purpose of simplifying network requests (the notification essentially can pertain to one kind of network request), since the loaded program modules have hierarchical relationship between each other, the client has established the hierarchical relationship between the loaded program modules, and only notifies the root module in the loaded program modules. According to one embodiment of the invention, the client locally maintains the hierarchical relationship between the loaded program modules (for example, by constructing and maintaining a local global variable).

Next, in step 304, according to the root module information in said notification, information of the loaded root module and said child modules of the loaded root module is obtained. The step 304 is similar to the step 202, and will not be described again. The difference between the step 304 and the step 202 is that, the step 202 needs to actually obtain the root module to be loaded and its child modules, while the step 304 only needs to contain the information of the loaded root module and its child modules, without actually obtaining the loaded root module and its child modules.

In step 305, the loaded root module and all its child modules are deleted from the obtained root module and the child modules of the root module. In order to avoid reloading the loaded program modules, these loaded program modules are deleted from the program modules to be loaded. Next, in step 306, the remaining program modules undergone through the deleting of the loaded root module and all the child modules thereof is sent to said client. The step 306 can be understood as a step corresponding to the step 206 in FIG. 2, which both send to the client the modules to be loaded that is determined as being necessary to be finally transmitted through the network to the client.

Figure 3B:
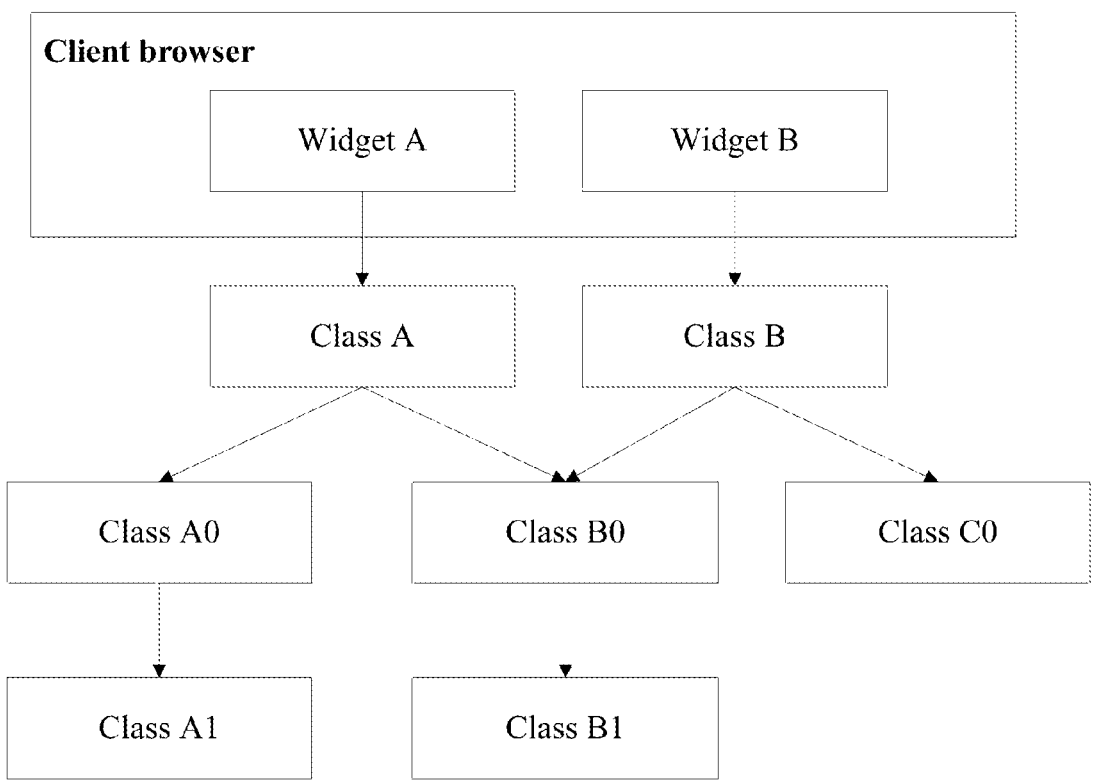
FIG. 3B shows a hierarchical relationship diagram of program modules requested to be loaded by a client according to an embodiment of the invention.

It is to be noted that, although the order of the steps 301-306 is set in FIG. 3 and the above text description, the executing order of the steps 301-306 or the relationship between the steps can be varied without departing from the concept of the invention. According to one embodiment of the invention, the request for loading the program modules received in the step 301 includes the notification relating to the loaded program modules, in addition to the root module information of the program modules to be loaded. That is, the notification in the step 303 and the request in the step 301 can be issued by the client simultaneously. According to one embodiment of the invention, the step 304 can be executed first, and to obtain the information of the loaded root module and the child modules of the loaded root module, according to the root module information in the notification. Then, the step 302 is executed, to obtain the root module to be loaded and the child modules of the root module to be loaded, according to the root module information in the request. Since before the step 302 is executed, it has been known which of the program modules have been loaded, when executing step 302, only the unloaded program modules in the program modules to be loaded can be obtained, that is, it is not necessary to first obtain all the program modules to be loaded, and then deleting the loaded program modules therefrom, but only to determine the program modules to be loaded which are necessary to be finally transmitted. In this case, the step 305 is not necessary to be executed again. In all, the orders of the steps in FIG. 2 and FIG. 3 are only illustrative, but not limitative on the invention.

With the method as shown in FIG. 3A, distinctive from the existing technical solution, the client, when sending the request for loading the program modules, can only tell about the root module information of the program modules to be loaded, and notify of which of the program modules have been loaded (when notifying, only notify the root module of the loaded program modules), and the loading of all the modules to be loaded can be implemented by only sending the loading request and the notification once (and the loading request is very simple, and only includes the root module information) (and only the program modules which are required by the client but are still not loaded are loaded), so as to avoid transmitting unnecessary code content, avoid transmitting repetitive code content, and avoid complicated network requests, as desired by the invention, thereby greatly save the network bandwidth and the delay for loading many program modules.

Another technical effect of the method as shown in FIG. 2 and FIG. 3A is especially obvious in HTTP request. In order to satisfy the Catch characteristic of the HTTP request, the Get request in the HTTP request has to be used (the Get request only includes a URL address), but the Post request in the HTTP request can not be used (the Post request includes many parameter information, and can not satisfy the Catch characteristic). However, normally, when the client requests to load a large amount of program modules, all the required program modules can not be loaded one by one by the Get request (particular URL address). The advantage of the invention is that: the request only includes the root module, without the information of other modules, and the Get request can be used to send the request for loading the program modules, so that the Catch characteristic can be satisfied. The particular content relating to the Catch characteristic belongs to the common knowledge of the art, which is not described again.

Below, in combination with the method as shown in FIG. 2 and FIG. 3A, the method provided by the invention for loading the program modules with hierarchical relationship is described by one simple example. Assuming the client browser has two Widgets, i.e., Widget A and Widget B. In the first, the client has no loaded program module. Now, the Widget A requests to load Class A (Class A is a program module), and the Class A includes child classes (child modules) A0 and B0, and A0 further includes a child class A1, and B0 further includes a child class B1. Thus, the Widget A only issues a request for loading the Class A (the root module) to the server end. After the server end receives the request, by using the hierarchical relationship information between the program modules and the root module information in the request, the Class A and all its four child classes A0, A1, B0 and B1 are obtained, and these five classes are packed and sent to the client, so that the loading request of the Widget A is completed.

Next, assuming that the other Widget B of the same client requests to load Class B, and the Class B includes child classes (child modules) B0 and C0, and Class B0 further includes a child class B1, thus, the Widget B issues a request for loading the Class B to the server end (the request only includes the root Class B), and notifies the server end that Class B0 has been loaded (the notification only includes the root Class B0). The server end, when receiving the request and the notification sent from the Widget B, determines the classes to be loaded by the Widget B are the classes B, B0, B1, C0, and the classes B0 and B1 have been loaded, so the server end only obtains the class B and the class C0, and packs the two program classes and sends them to the client, so that the loading request of the Widget B is completed.

Figure 4:
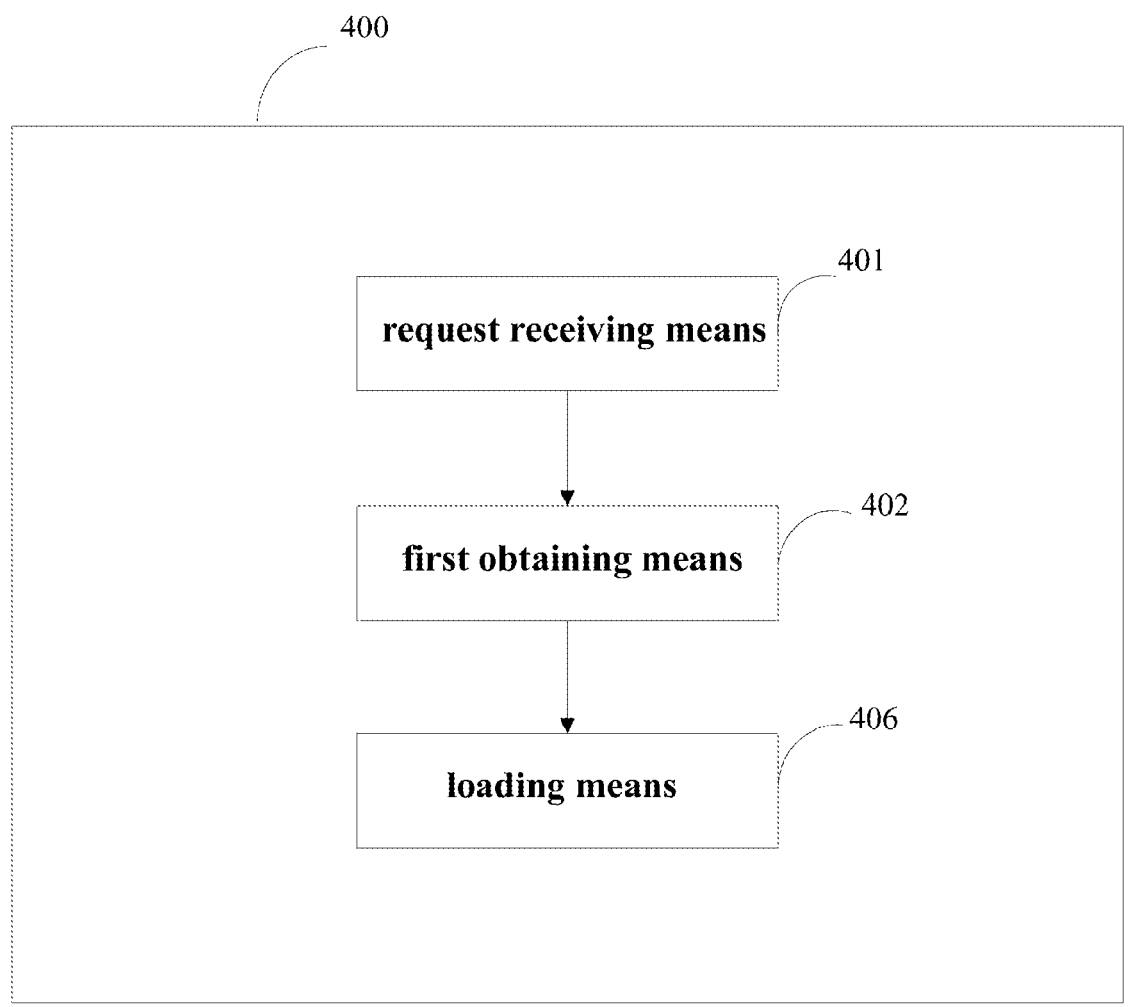
FIG. 4 shows a block diagram of a system for loading program modules with hierarchical relationship according to an embodiment of the invention.

FIG. 4 shows a block diagram of a system for loading program modules with hierarchical relationship according to an embodiment of the invention. The system as shown in FIG. 4 is represented by a system 400 entirely. Particularly, the system 400 includes request receiving means 401, configured to receive a request for loading the program modules from a client, said request including root module information in the program modules to be loaded; first obtaining means 402, configured to, according to the root module information in said request, obtain a root module to be loaded and child modules of the root module to be loaded; and loading means 406, configured to send said root module and said child modules of the root module to said client. The person skilled in the art should understand, the means 401, 402 and 406 in the system 400 correspond to the steps 201, 202 and 206 in the method as shown in FIG. 2, respectively, which will not be described again.

Figure 5:
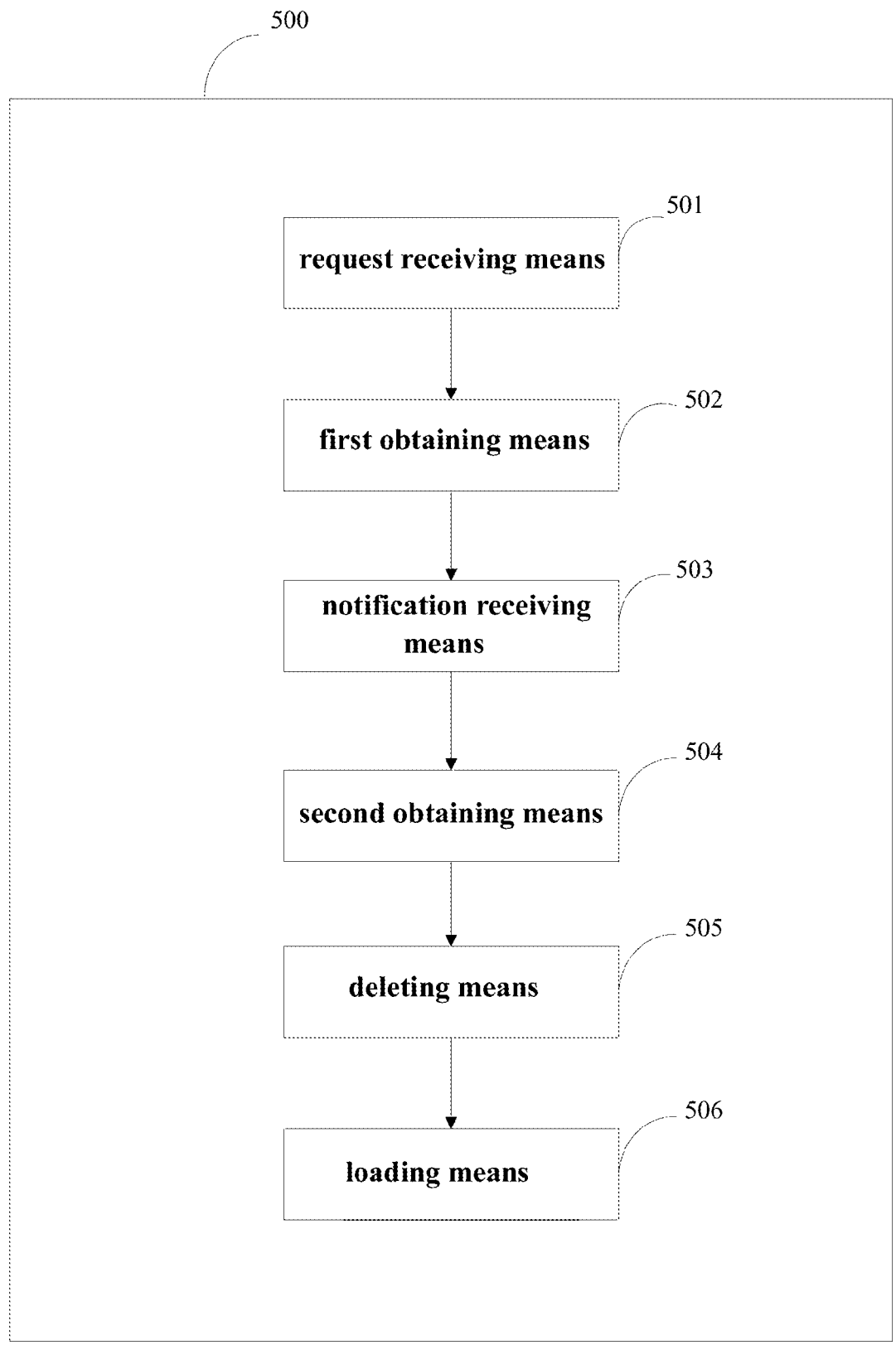
FIG. 5 shows a block diagram of a system for loading program modules with hierarchical relationship according to an embodiment of the invention.

FIG. 5 shows a block diagram of a system for loading program modules with hierarchical relationship according to an embodiment of the invention. The system as shown in FIG. 5 is represented by a system 500 entirely. Particularly, the system 500 includes request receiving means 501, configured to receive a request for loading the program modules from a client, said request including root module information in the program modules to be loaded; first obtaining means 502, configured to, according to the root module information in said request, obtain a root module to be loaded and child modules of the root module to be loaded; notification receiving means 503, configured to receive a notification relating to the loaded program modules from the client, said notification including the root module information in the loaded program modules; and second obtaining means 504, configured to, according to the root module information in said notification, obtain information of the loaded root module and said child modules of the loaded root module; deleting means 505, configured to delete the loaded root module and all its child modules from the obtained root module and the child modules of the root module; and loading means 506, configured to send said root module and said child modules of the root module to said client. The person skilled in the art should understand, the means 501-506 in the system 500 correspond to the steps 301-306 in the method as shown in FIG. 3, respectively, which will not be described again.

The flowcharts and the block diagrams in the drawings illustrate the possible architecture, the functions and the operations of the system, the method and the computer program product according the embodiments of the invention. In this regard, each block in the flowcharts or block diagrams may represent a portion of a module, a program segment or a code, and said portion of the module, the program segment or the code includes one or more executable instructions for implementing the defined logical functions. It should be also noted that in some implementations as alternatives, the functions labeled in the blocks may occur in an order different from the order labeled in the drawings. For example, two sequentially shown blocks may be substantially executed in parallel in fact, and they sometimes may also be executed in a reverse order, which is defined by the referred functions. It also should be also noted that, each block in the flowcharts and/or the block diagrams and the combination of the blocks in the flowcharts and/or the block diagrams may be implemented by a dedicated system based on hardware for executing the defined functions or operations, or may be implemented by a combination of the dedicated hardwares and computer instructions.

Although the system and the method of processing local files by using a remote-distance application of the invention are described with reference to the preferred embodiments of the invention, the invention is not limited to this. It will be obvious by the person skilled in the art that without departing the spirit and scope of the invention defined by the appended claims, various variations, alternations and modifications can be performed on the invention. It should be understood that, all of such variations, alternations and modifications still fall within the protection scope of the invention, and the protection scope of the invention is defined by the appended claims.

What is claimed is:

1. A method for loading program modules with hierarchical relationship, comprising:
   receiving a request for loading the program modules from a client, said request including root module information in the program modules to be loaded;
   according to the root module information in said request, obtaining a root module to be loaded and child modules of the root module to be loaded using a hardware processor;
   sending said root module and said child modules of the root module to said client;
   receiving a second request for loading a second set of program modules from the client, the second request including
      root module information for the second set of program modules and
      a notification about a previously-loaded root module;
   according to the root module information in the second request, obtaining a root module and child modules thereof for the second set of program modules;
   identifying, based upon the notification, child modules of the previously-loaded root module;
   deleting, from the second set of program modules, any modules within the second set of program modules duplicative of the identified child modules of the previously-loaded root module; and
   sending, after the deleting and to the client, the remaining program modules of the second set of program modules.

2. The method according to claim 1, further comprising:
   obtaining hierarchical relationship information between all the program modules by sequentially analyzing each program module.

3. The method according to claim 1, further comprising:
   obtaining, in response to the request, hierarchical relationship information between the program modules to be loaded.

4. The method according to claim 1, wherein
   said program modules are program Class, and
   said program modules with hierarchical relationship are loose-coupled with each other.

5. The method according to claim 1, wherein
   said request only includes the root module information in the program modules to be loaded, and
   said notification only includes the root module information in previously-loaded program modules within the client.

6. A system for loading program modules with hierarchical relationship, comprising:
   a hardware processor configured to initiate executable operations comprising:
      receiving a request for loading the program modules from a client, said request including root module information in the program modules to be loaded;
      according to the root module information in said request, obtaining a root module to be loaded and child modules of the root module to be loaded;
      sending said root module and said child modules of the root module to said client;
      receiving a second request for loading a second set of program modules from the client, the second request including
         root module information for the second set of program modules and
         a notification about a previously-loaded root module;
      according to the root module information in the second request, obtaining a root module and child modules thereof for the second set of program modules;
      identifying, based upon the notification, child modules of the previously-loaded root module;
      deleting, from the second set of program modules, any modules within the second set of program modules duplicative of the identified child modules of the previously-loaded root module; and
      sending, after the deleting and to the client, the remaining program modules of the second set of program modules.

7. The system of claim 6, wherein the hardware processor is further configured to initiate an executable operation comprising:
   obtaining hierarchical relationship information between all the program modules by sequentially analyzing each program module.

8. The system of claim 6, wherein the hardware processor is further configured to initiate an executable operation comprising:
   obtaining, in response to the request hierarchical relationship information between the program modules to be loaded.

9. The system of claim 6, wherein
   said program modules are program Class, and
   said program modules with hierarchical relationship are loose-coupled with each other.

10. The system of claim 6, wherein
    said request only includes the root module information in the program modules to be loaded, and said notification only includes the root module information in previously-loaded program modules within the client.

11. A computer program product for loading program modules with hierarchical relationship, the computer program product comprising:
  a computer readable storage memory having stored thereon program code that, when executed, configures a hardware processor to perform executable operations comprising:
  receiving a request for loading the program modules from a client, said request including root module information in the program modules to be loaded;
  according to the root module information in said request, obtaining a root module to be loaded and child modules of the root module to be loaded;
  sending said root module and said child modules of the root module to said client
  receiving a second request for loading a second set of program modules from the client, the second request including
    root module information for the second set of program modules and
    a notification about a previously-loaded root module;
  according to the root module information in the second request, obtaining a root module and child modules thereof for the second set of program modules;
  identifying, based upon the notification, child modules of the previously-loaded root module;
  deleting, from the second set of program modules, any modules within the second set of program modules duplicative of the identified child modules of the previously-loaded root module; and
  sending, after the deleting and to the client, the remaining program modules of the second set of program modules, wherein
  the computer readable storage memory is not a transitory, propagating signal per se.

12. The computer program product of claim 11, wherein the computer readable storage memory further comprises program code that, when executed, configures the processor to perform an executable operation comprising:
  obtaining hierarchical relationship information between all the program modules by sequentially analyzing each program module.

13. The computer program product of claim 11, wherein the computer readable storage memory further comprises program code that, when executed, configures the processor to perform an executable operation comprising:
  obtaining, in response to the request, hierarchical relationship information between the program modules to be loaded.

14. The computer program product of claim 11, wherein
said program modules are program Class, and
said program modules with hierarchical relationship are loose-coupled with each other.

15. The computer program product of claim 11, wherein
said request only includes the root module information in the program modules to be loaded, and
said notification only includes the root module information in previously-loaded program modules within the client.

\* \* \* \* \*